No. 777,241. PATENTED DEC. 13, 1904.
I. D. CADY.
VEHICLE SHAFT SUPPORTER.
APPLICATION FILED JUNE 18, 1903.
NO MODEL.
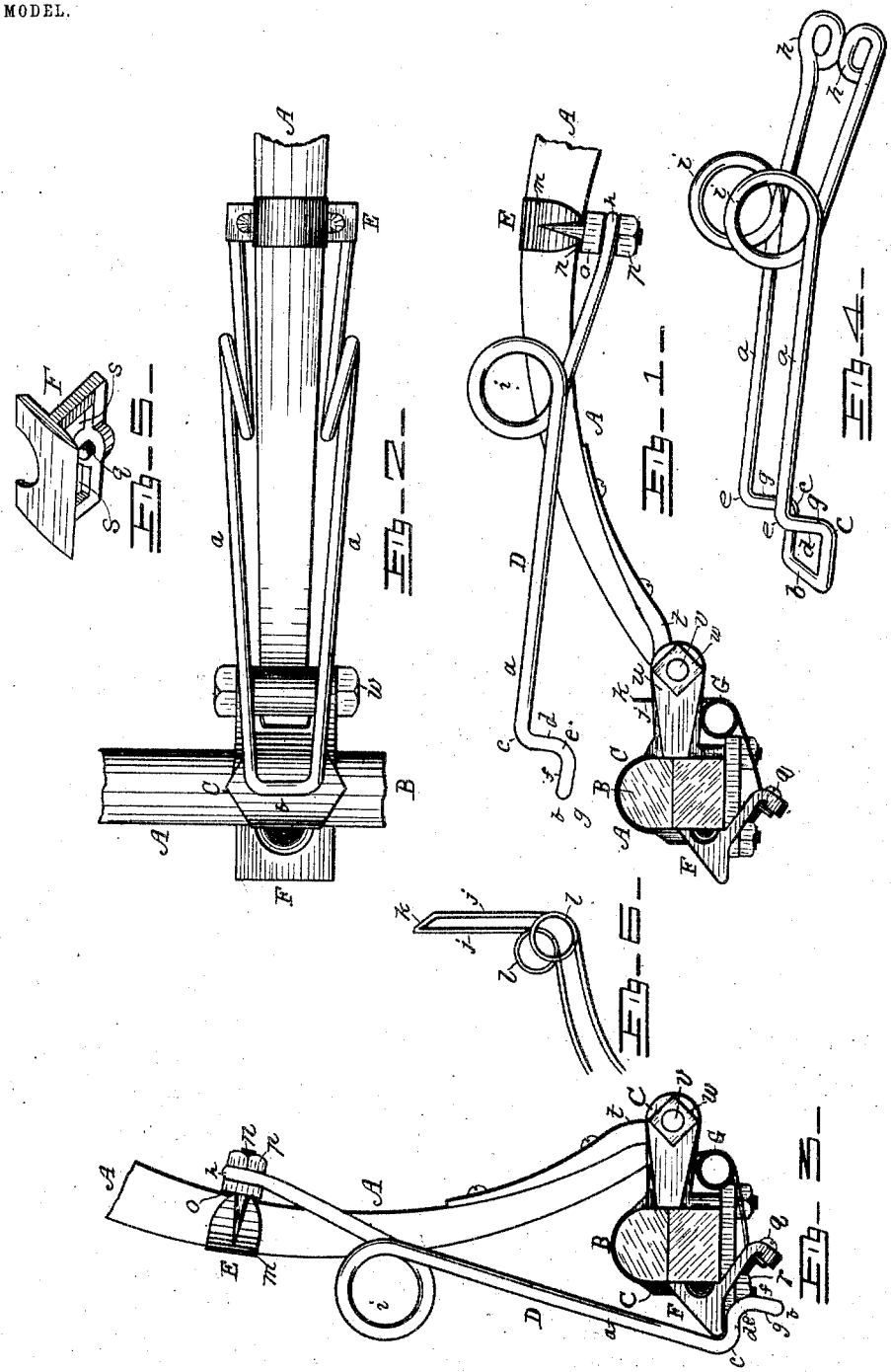
WITNESSES
INVENTOR
Ira D. Cady
By J. W. Powers
Atty No. 777,241. Patented December 13, 1904.

UNITED STATES PATENT OFFICE.

IRA D. CADY, OF MINNEAPOLIS, MINNESOTA.

VEHICLE-SHAFT SUPPORTER.

SPECIFICATION forming part of Letters Patent No. 777,241, dated December 13, 1904.

Application filed June 18, 1903. Serial No. 162,094. (No model.)

*To all whom it may concern:*

Be it known that I, IRA D. CADY, of Minneapolis, in the county of Hennepin and State of Minnesota, have invented a certain new and useful Improvement in Vehicle-Shaft Supporters, of which the following is a full, clear, and exact description, reference being had to the accompanying drawings, which form a part of this specification.

My invention has for its object the production of cheap and efficient means for supporting the shafts of a vehicle in an elevated position when not in use; and it consists in affixing resilient supporters to the rear portions of the said shafts which supporters when the vehicle is in use and the shafts are lowered to a horizontal position will remain free or out of contact with the axle, but when the vehicle is not in use and the shafts are raised to a vertical position the rear ends of said supporters will engage with suitable catches affixed to the rear and bottom side of the said axle, thereby supporting the said shafts in their then elevated position.

In the drawings, Figure 1 is a side elevation of a carriage-shaft equipped with one of my supporters and a cross-section of a carriage-axle, the shaft being in a horizontal position, as when in use. Fig. 2 is a top or plan view of the same; Fig. 3, another side elevation of a carriage-shaft equipped with one of my supporters and a cross-section of a carriage-axle, the shaft being in a vertical position, as when not in use. Fig. 4 is a view in perspective of one of my supporters. Fig. 5 is a view in perspective of one of my catches. Fig. 6 is a perspective of one of my springs.

Similar letters refer to similar parts, A being the shaft, B the axle, C the clip, D the supporter, E the clamp, F the catch, and G the springs.

The shaft A, axle B, clip C, and clamp E are not unlike those commonly used, and hence need no detailed description herein.

The supporters D (shown detached in Fig. 4) I form in the following manner: Taking a piece of spring-steel wire of the required length, (about fifteen inches,) I bend it intermediate its length, thus forming the parallel bars $a\ a$ of equal length, the rear ends of which are connected by the laterally-bent portion $b$. This bifold I then bend laterally at $c$ to substantially a right angle, thus forming the lateral portion $d$, which lateral portion I in turn bend laterally at $e$ to substantially a right angle, thus forming the offset $g$. I then form the free forward ends of the parallel bars $a\ a$ into the horizontal loops $h\ h$ and complete my supporter by forming the vertical loops $i\ i$ in the parallel bars $a\ a$ intermediate their length.

The catch F (shown detached in Fig. 5) is configured to adapt it to attachment with the axle B, a portion of it resting in the rear and a portion of it underneath the axle B, as shown in Figs. 1 and 3.

The spring G (shown detached in Fig. 6) I form in the following manner: Taking a piece of spring-steel wire of the required length, (about seven inches,) I bend it intermediate its length, thus forming the parallel bars $j\ j$ of equal length, the forward ends of which are connected by means of the semicircular portion $k$. This bifold I then bend intermediate its length, forming therein the vertical coils or loops $l$.

These several portions I connect in the following manner: I affix the supporter D to the shaft A by means of the clamp E, placing the flattened portion $m$ thereof over and upon the shaft A, connecting the downwardly-extending threaded portions $n$ by means of the connecting-bar $o$, placing the horizontal loops $h\ h$ under and around the said threaded portions $n$ of the clamp E and by screwing thereon the threaded jam-nuts $p$. The catches F, I secure to the axle B by placing them in proper position partly underneath and partly in the rear thereof, where I secure them in place by tightening the clamp-screws $q$, which clamp-screws impinge the front side of the jam-nuts $r$, which jam-nuts secure in turn the clips C to the axle B. The springs G, I place in position underneath and in front of the clips C, running the free rear ends thereof through the openings $s$ of the catches F and by extending their folded semicircular portions $k$ upward and in front of the clips C, where they are securely held in place by the shaft-irons $t$. I then connect the shafts A to the axle B in the usual manner—that is, I place the rear ends of the shaft-irons $t$ between the pierced ears $u$ of the clip C, insert the coupling-bolts $v$, and screw thereon the clamp-nuts $w$.

The operation of my shaft-supporter is as follows: When the vehicle is in use and the shafts are lying in a horizontal position, the rearwardly-extending supporter D is free from contact with the carriage-axle or any attachment thereof. Hence there is no rubbing of parts; but when the vehicle is not in use and it is desirable to support the shafts free from the floor I raise them to a vertical position, when the rear ends of the supporters D will pass over, downward, and rearward of the axle B, and their laterally-bent offset portions will contact with, override, and underlie the rear portion of the catches F, where they will be held in place through the tension of flexible bars $a\ a$ and the springs G.

Having thus described my invention, what I claim as new, and desire to secure by Letters Patent, is—

A device of the type set forth, comprising, in combination with the shaft and axle, a clamp adjustably mounted upon the said shaft, and a supporter formed of an integral piece of wire bent into a U shape, the free ends of the wire being formed into loops and immovably fixed in the clamp, resilient coils formed in the parallel bars of the said supporter intermediate its length, an offset formed in the looped portion of the supporter, a catch rigidly affixed to the said axle with which the said supporter partially engages, and a spring lying between the said catch and the said shaft, all substantially as shown and described and for the purposes specified.

IRA D. CADY.

Witnesses:
FRANK G. O'BRIEN,
H. A. PETERS.